(12) United States Patent
Kawaguchi

(10) Patent No.: US 10,289,581 B2
(45) Date of Patent: May 14, 2019

(54) INFORMATION PROCESSING DEVICE, INFORMATION PROCESSING METHOD, AND RECORDING MEDIA

(71) Applicant: NEC Corporation, Minato-ku, Tokyo (JP)

(72) Inventor: Eiichiro Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 404 days.

(21) Appl. No.: 14/994,315

(22) Filed: Jan. 13, 2016

(65) Prior Publication Data

US 2016/0232117 A1    Aug. 11, 2016

(30) Foreign Application Priority Data

Feb. 10, 2015  (JP) .................................. 2015-023756

(51) Int. Cl.
    G06F 13/42      (2006.01)
    G06F 13/362     (2006.01)
    H04L 12/933     (2013.01)
    G06F 13/40      (2006.01)

(52) U.S. Cl.
    CPC ........ G06F 13/362 (2013.01); G06F 13/4022 (2013.01); H04L 49/101 (2013.01)

(58) Field of Classification Search
    CPC ............... G06F 13/4022; H04L 49/254; H04L 49/3072
    See application file for complete search history.

(56) References Cited

U.S. PATENT DOCUMENTS

| 2002/0191626 A1* | 12/2002 | Moriwaki | ............. | H04L 49/254 370/413 |
| 2004/0228340 A1* | 11/2004 | Akella | ..................... | H04L 49/30 370/386 |
| 2006/0187837 A1* | 8/2006 | Warren | .................. | H04L 49/357 370/235 |

FOREIGN PATENT DOCUMENTS

| JP | H05-145573 A | 6/1993 |
| JP | H05-308686 A | 11/1993 |
| JP | 2000-295289 A | 10/2000 |
| JP | 2005-252953 A | 9/2005 |
| JP | 2006-262243 A | 9/2006 |
| JP | 2014-501950 A | 1/2014 |

OTHER PUBLICATIONS

Japanese Office Action for JP Application No. 2015-023756 dated Mar. 8, 2016 with English Translation.

\* cited by examiner

*Primary Examiner* — Ilwoo Park

(57) ABSTRACT

An information processing device according to the present invention includes: a crossbar switch which arbitrates a plurality of input data, and outputs the arbitrated input data to either one of a plurality of output destinations; an output port control unit which receives output data from the crossbar switch as the output destination of the crossbar switch, and transmits the received output data to an external device; a first input port control unit which receives data with a lower bandwidth than a bandwidth of the crossbar switch, and outputs the received data with the same bandwidth as the bandwidth of the crossbar switch to the crossbar switch; and a second input port control unit which receives data with the same bandwidth as the bandwidth of the crossbar switch, and outputs the received data to the crossbar switch without changing the bandwidth of the received data.

7 Claims, 12 Drawing Sheets

INFORMATION PROCESSING DEVICE, INFORMATION PROCESSING METHOD, AND RECORDING MEDIA

This application is based upon and claims the benefit of priority from Japanese Patent Application No. 2015-023756, filed on Feb. 10, 2015, the disclosure of which is incorporated herein in its entirety by reference.

TECHNICAL FIELD

The present invention relates to data communication path control, in particular to an information processing device, an information processing method, and a recording media which include a switch for switching communication paths including a plurality of input and output ports.

BACKGROUND ART

An information processing device included in an information processing system transmits and receives data to and from other information processing devices. Also, a configuration included in each information processing device transmits and receives data to and from other configurations to proceed processing. A connection of a plurality of these devices or configurations is realized with a switch for switching and connecting a plurality of communication paths. A crossbar switch is the one that switches and connects a plurality of communication paths in this manner (for example, refer to Japanese Unexamined Patent Application Publication (Translation of PCT Application) No. 2014-501950 (hereinafter referred to as PTL 1)).

A crossbar switch switches a connection between input and output ports based on arbitration.

However, a common crossbar switch such as a technology described in PTL 1 has an issue that its performance declines when it connects to input ports with different bandwidths.

Hereinafter, referring to the drawings, this issue will be described.

FIG. 1 is a diagram showing an example of a common crossbar switch 90 used in a description below. The crossbar switch 90 shown in FIG. 1 includes input ports with a plurality of bandwidths as its input port bandwidth. More specifically, the crossbar switch 90 shown in FIG. 1 includes input ports A and B with a bandwidth of 8 [B/T] and input ports C and D with a bandwidth of 16 [B/T]. This [B/T] indicates "bytes/cycle" which is one of units of data bandwidth. In addition, the bandwidth of the output direction of the crossbar switch 90 (output ports A, B, and C) is 16 [B/T].

FIG. 2 is a diagram showing an example of data transfer after arbitration in the crossbar switch 90 shown in FIG. 1. FIG. 2 shows an example of outputting input data of the input ports A, B, and C from the output port A of the crossbar switch 90. FIG. 2 shows a case when the input port A first successfully participates in the arbitration in the crossbar switch 90 and secures the output port A.

As shown in FIG. 2, the input port A transmits (passes) data to the crossbar switch 90 in the bandwidth of 8 [B/T]. At the output port A of the crossbar switch 90, therefore, a vacancy occurs in the output port A between the time $t_2$ and $t_9$ when the data is output from the input port A. This is why the performance of the crossbar switch 90 declines.

In the example shown in FIG. 2, the output port bandwidth reduces by half and the performance considerably declines. Therefore, for the information processing devices which require high performance, the control as shown in FIG. 2 is not used.

A method of using a buffer is a countermeasure against the problem shown in FIG. 2 (for example, refer to Japanese Unexamined Patent Application Publication No. 2005-252953 (hereinafter referred to as PTL 2)).

FIG. 3 is a diagram showing an example of data transfer with buffers. This means FIG. 3 is a diagram showing an example of the technology for preventing the preceding problem.

The crossbar switch 90 shown in FIG. 3 is equipped with buffers (buffers A and B in FIG. 3) which have enough capacity to save all the received flits for input ports (especially, input ports with a low bandwidth). This flit means a unit of data transferred per cycle. The input ports with the low bandwidth of the crossbar switch 90 (the input ports A and B) save flits (data) in the buffers. After all the flits (data) are saved in the buffers, the input ports with the low bandwidth participate in arbitration. When the input ports with the low bandwidth successfully participate in the arbitration, they send out the saved data in the buffers so that there is no vacancy in the output ports.

For example, the input ports A and B shown in FIG. 3 save the flits (data) which are input with a bandwidth of 8 [B/T] in the buffers (input buffers A and B). After all the flits are provided, the input ports A and B participate in the arbitration of the crossbar switch 90. For example, the input port A participates in the arbitration at the time $t_9$ because all the flits are provided at the time $t_8$. The input ports A and B output data with a bandwidth of 16 [B/T] when they successfully participate in the arbitration. In this case, the crossbar switch 90 can achieve performance of 16 [B/T].

It is noted that data of input ports not shown is output from the output port A from the time $t_0$ to $t_5$ in FIG. 3.

SUMMARY

An object of this present invention is to provide an information processing device, an information processing method, and a recording media for reducing buffers (hardware) necessary for input ports.

An information processing device according to an aspect of the present invention includes: a crossbar switch which arbitrates a plurality of input data, and outputs the arbitrated input data to either one of a plurality of output destinations; an output port control unit which receives output data from the crossbar switch as the output destination of the crossbar switch, and transmits the received output data to an external device; a first input port control unit which receives data with a lower bandwidth than a bandwidth of the crossbar switch, and outputs the received data with the same bandwidth as the bandwidth of the crossbar switch to the crossbar switch; and a second input port control unit which receives data with the same bandwidth as the bandwidth of the crossbar switch, and outputs the received data to the crossbar switch without changing the bandwidth of the received data.

An information processing method according to an aspect of the present invention is a method for an information processing device which includes a crossbar switch which arbitrates a plurality of input data, and outputs the arbitrated input data to either one of a plurality of output destinations. The method includes: transmitting output data from the crossbar switch to an external device; receiving data with a lower bandwidth than a bandwidth of the crossbar switch, and outputting the received data with the same bandwidth as the bandwidth of the crossbar switch to the crossbar switch; and receiving data with the same bandwidth as the bandwidth of the crossbar switch, and outputting the received data to the crossbar switch without changing the bandwidth of the received data.

A computer readable non-transitory recording medium according to an aspect of the present invention embodies a program. The program causes a computer to perform a method. The computer includes a crossbar switch which arbitrates a plurality of input data, and outputs the arbitrated input data to either one of a plurality of output destinations. The method includes: transmitting output data from the crossbar switch to an external device; receiving data with a lower bandwidth than a bandwidth of the crossbar switch, and outputting the received data with the same bandwidth as the bandwidth of the crossbar switch to the crossbar switch; and receiving data with the same bandwidth as the bandwidth of the crossbar switch, and outputting the received data to the crossbar switch without changing the bandwidth of the received data.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
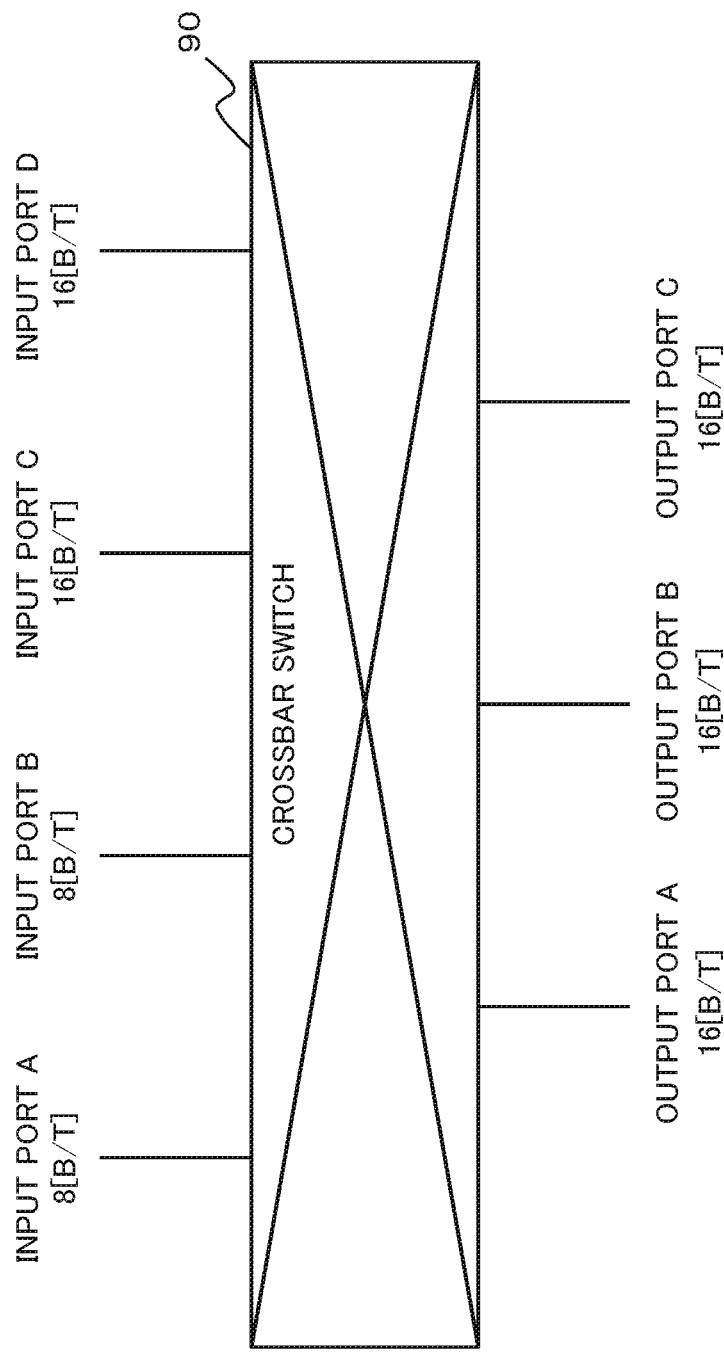
FIG. 1 is a diagram showing an example of a common crossbar switch.
Figure 2:
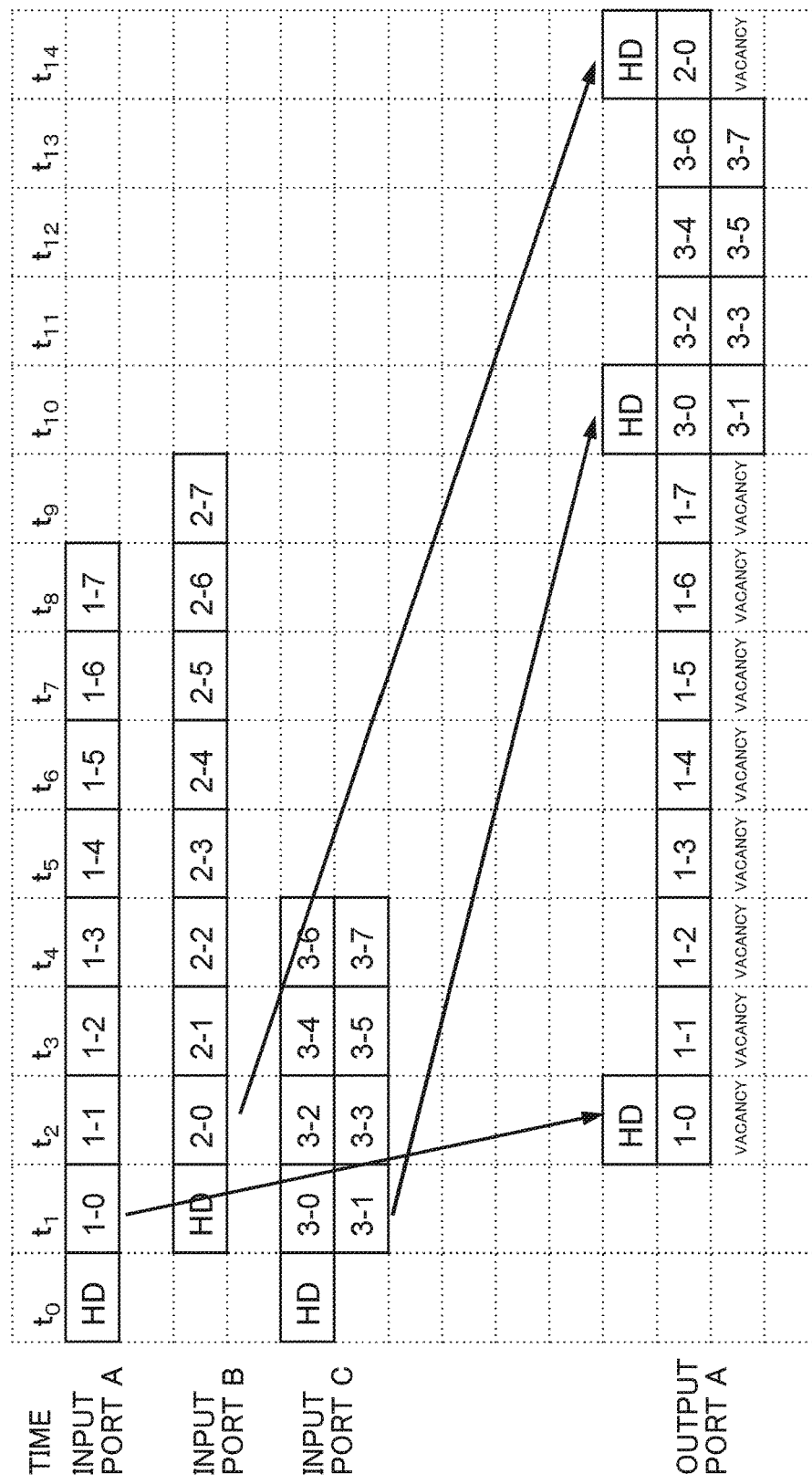
FIG. 2 is a diagram showing an example of data transfer in the crossbar switch shown in FIG. 1.

The exemplary embodiments in the present invention will be described with reference to the drawings.

The respective drawings are for a description of exemplary embodiments of the present invention. However, the present invention is not limited to the descriptions of each drawing. Also, like configurations of each drawing have the same numerals, and the descriptions of that repetition may be omitted.

Furthermore, in the drawings used in the following description, a partial configuration not related to the description of the present invention may not be described or illustrated.

In an exemplary embodiment of the present invention, data with a plurality of bandwidths is received as inputs. Values of the bandwidths in this exemplary embodiment are not particularly limited. However, values of high bandwidths are preferably integral multiples of low bandwidth values, especially multiples of powers of 2. In the following description, two types of bandwidths, a low bandwidth of 8 [B/T] and a high bandwidth of 16 [B/T], are used for convenience of description.

Further, data includes a header section which shows an attribute of the data (simply called a header, as well) and a main body of data which retains a specific content of data (simply called data, as well). In the following description, however, the headers and data are collectively called data unless they are necessarily distinguished.

Data is also divided and transmitted in a predetermined unit. A flit is a unit of data which is transmitted to an information processing device 50 within a cycle. This means data is transmitted to the information processing device 50 per flirt.

First Exemplary Embodiment

Referring to the drawings, a first exemplary embodiment in the present invention will be described.

Description of Configuration

Firstly, a configuration of the information processing device 50 according to the first exemplary embodiment will be described with reference to drawings.

Figure 5:
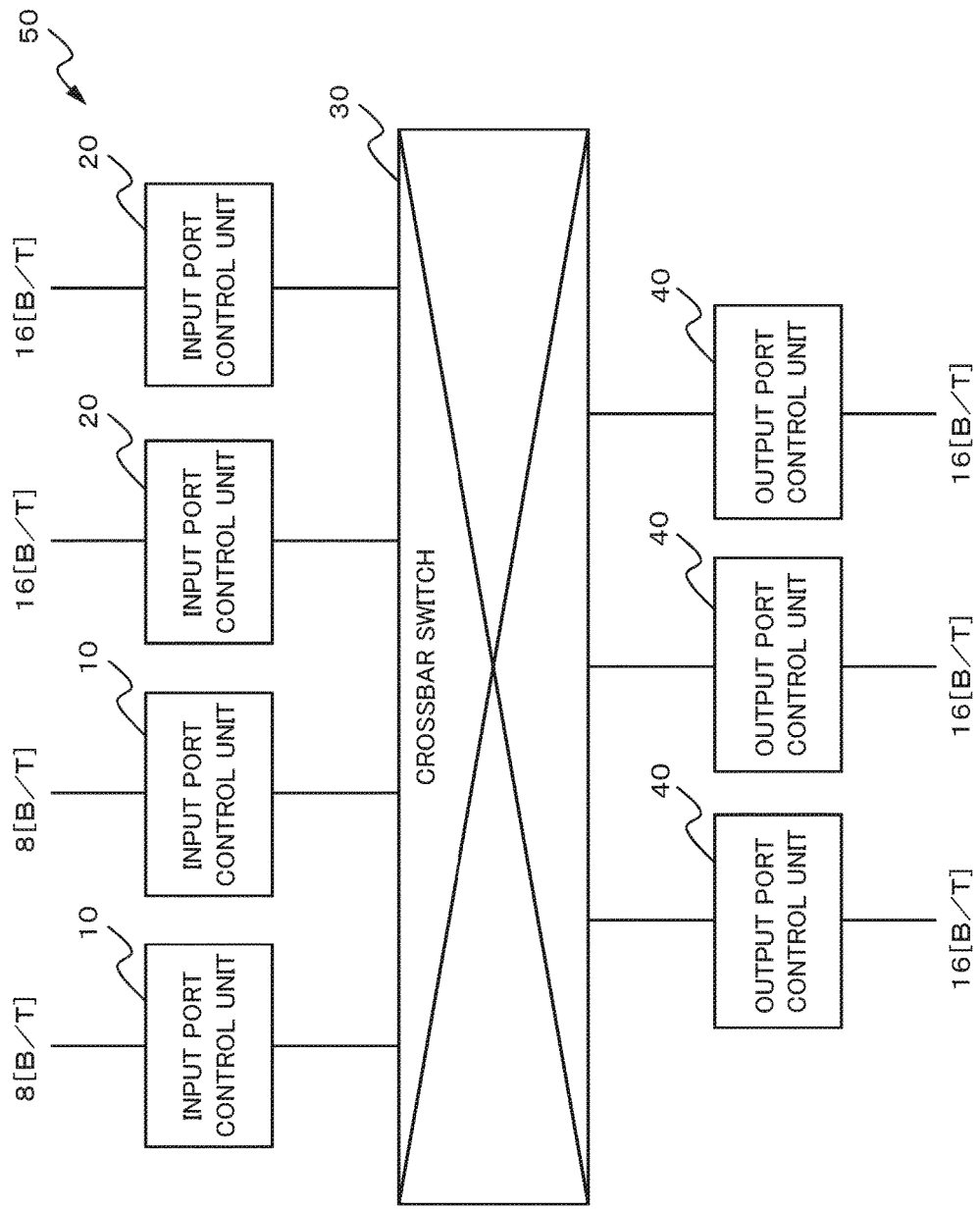
FIG. 5 is a diagram showing an example of a configuration of the information processing device according to the first exemplary embodiment.

FIG. 5 is a block diagram showing an example of the configuration of the information processing device 50 according to the first exemplary embodiment in the present invention. The information processing device 50 includes an input port control unit 10, an input port control unit 20, a crossbar switch 30, and an output port control unit 40. The information processing device 50 includes at least one input port control unit 10, one input port control unit 20, and one output port control unit 40 respectively. However, the information processing device 50 may include a plurality of input port control units 10, input port control units 20, and/or output port control units 40. FIG. 5 shows, as an example, a case where there are two of each input port control units 10 and 20, and three output port control units 40.

The input port control unit 10 (a first input port control unit) receives data from an external device not shown with a lower bandwidth than input port of the crossbar switch 30. Then the input port control unit 10 transmits the received data to the input ports of the crossbar switch 30 with the same bandwidth as the input ports of the crossbar switch 30.

On the other hand, the input port control unit 20 (a second input port control unit) receives data with the same bandwidth as the input port of the crossbar switch 30. Then the input port control unit 20 transmits the data to the input port of the crossbar switch 30 while maintaining the bandwidth.

This means the input port control unit 20 receives data with a higher bandwidth compared with data received by the input port control unit 10. In other words, in this case, the input port control unit 10 receives data with the bandwidth of 8 [B/T] and outputs the data with the bandwidth of 16 [B/T]. The input port control unit 20 receives and transmits data with the bandwidth of 16 [B/T]. It is noted that the bandwidth of the input port of the crossbar switch 30 is 16 [B/T]. The bandwidth of the output port of the crossbar switch 30 is 16 [B/T].

The crossbar switch 30 is a switch that arbitrates data from the input port control units 10 and 20, and outputs the data to either of the output port control units 40. This means the crossbar switch 30 arbitrates destinations of received data from the input port control units 10 and 20 connected to a plurality of input ports, and outputs data to the output port control unit 40 connected to either one of output ports. As long as the crossbar switch 30 can realize data arbitration, its configuration and employed arbitration technique are not specifically limited. For example, the crossbar switch 30 may be realized by employing a common crossbar switch. Therefore, detailed descriptions of the crossbar switch 30 are omitted.

The number of inputs and outputs on the crossbar switch 30 is not specifically limited. The number of inputs and outputs on the crossbar switch 30 may be decided based on the number of the input port control units 10, input port control units 20, and output port control units 40 included in the information processing device 50. Therefore, FIG. 5 shows a configuration which has four inputs and three outputs as an example.

The output port control unit 40 receives data from the output port of the crossbar switch 30 and output data to a device external to the information processing device 50 (not shown). The bandwidth of the output port control unit 40 is preferably the bandwidth that does not limit output port performance of the crossbar switch 30. As described above, the bandwidth of the output port control unit 40 is 16 [B/T] in this description.

A configuration of the input port control unit 10 will be described.

Figure 6:
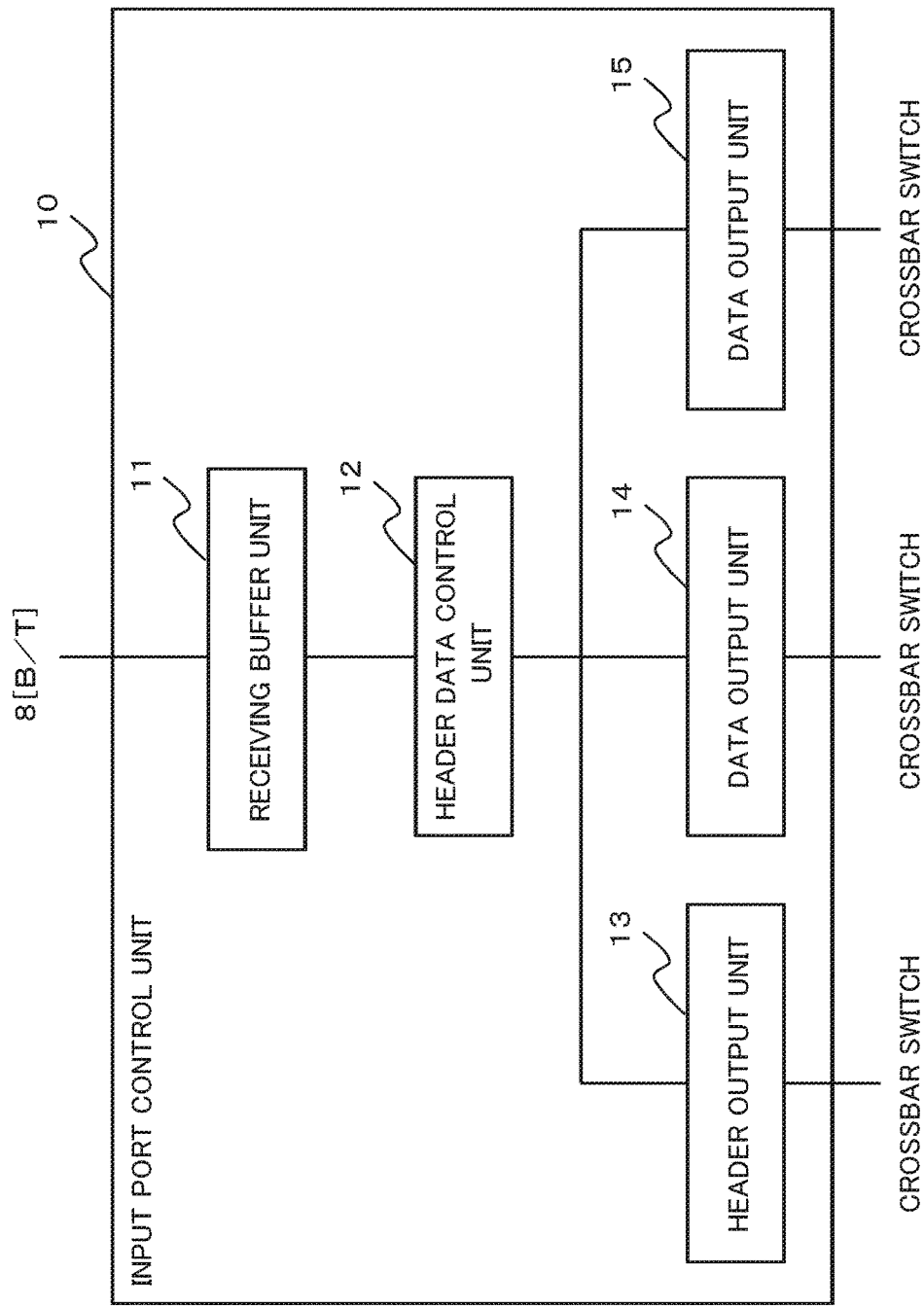
FIG. 6 is a block diagram showing an example of a configuration of a first input port control unit of the information processing device according to the first exemplary embodiment.

FIG. 6 is a block diagram showing an example of a configuration of the input port control unit 10 (a first input port control unit). The input port control unit 10 includes a receiving buffer unit 11, a header data control unit 12, a header output unit 13, a data output unit 14 (a first data output unit), and a data output unit 15 (a second data output unit).

Figure 3:
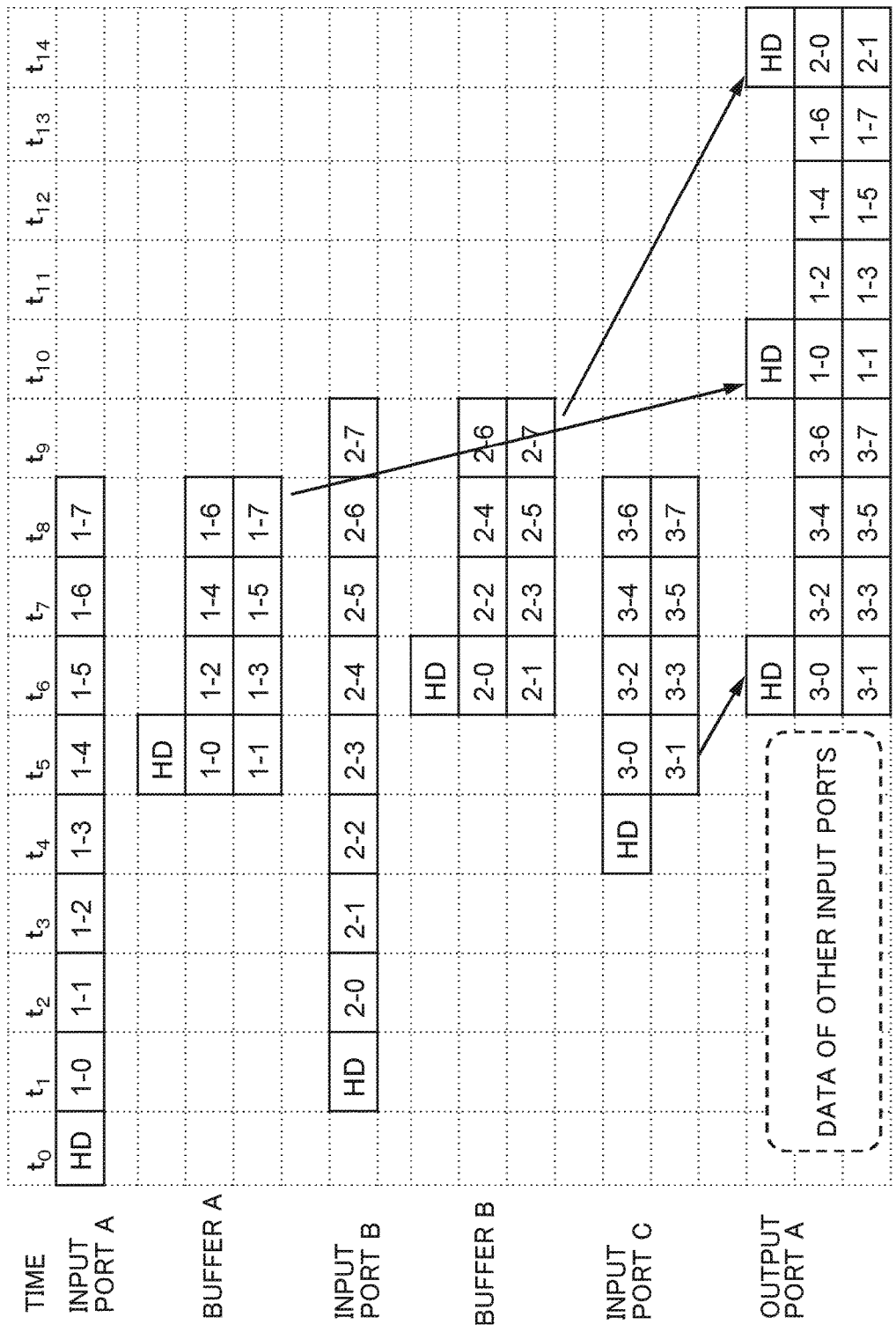
FIG. 3 is a diagram showing an example of data transfer with buffers.

The receiving buffer unit 11 receives data (headers and data) to be participated in arbitration of the crossbar switch 30, and temporarily retains (accumulates) the data. The receiving buffer unit 11 may perform timing adjustment with a device of a data transmission source not shown. Then, the receiving buffer unit 11 transmits the accumulated data (flit of header or data) to the header data control unit 12. The receiving buffer unit 11 may retain the data so that the header data control unit 12 can execute determination as described hereinafter. Therefore, the receiving buffer unit 11 may be the one that has enough capacity to accumulate part of data. This means the receiving buffer unit 11 is not the one with a large capacity to accumulate all the data as shown in FIG. 3. This allows the input port control unit 10 to require reduced capacity (hardware amount) of a buffer.

The header data control unit 12 determines whether the received flit from the receiving buffer unit 11 is a header or data. When the flit is data, the header data control unit 12 further determines whether it is even-numbered data (an even flit) or odd-numbered data (an odd flit). This determination method of the header data control unit 12 is not specifically limited. For example, the header data control unit 12 may determine based on the number of the payload included in a header.

When the flit is a header, the header data control unit 12 outputs the received flit (in this case, a header) to the header output unit 13. When it is an even flit, the header data control unit 12 outputs the received flit (data) to the data output unit 14. When it is an odd flit, the header data control unit 12 outputs the received flit (data) to the data output unit 15. This means the header data control unit 12 distributes received data (flits).

Furthermore, when the header data control unit 12 outputs data (flits) to both the data output units 14 and 15, it notifies the header output unit 13 that the data is provided. This notification is hereinafter referred to as "a data ready notification".

In the following description of this exemplary embodiment, it is supposed that data is transmitted from even-numbered data. That is, the header data control unit 12 determines that data is provided when it outputs data to the data output unit 15. Meanwhile, in the case of data is transmitted from odd-numbered data, the data output units 14 and 15 may be replaced in the following description.

The header output unit 13 receives and retains a header. Then, the header output unit 13 executes control of the header and participation in arbitration on the crossbar switch 30.

The header output unit 13 executes control of participation in arbitration as described below. The header output unit 13 participates in arbitration at the timing when data is provided on both the data output units 14 and 15. The header output unit 13 determines this timing based on the above-mentioned data ready notification from the header data control unit 12.

When unsuccessful participation in the arbitration (the arbitration does not pass), the header output unit 13 participates in the next arbitration again. The header output unit 13 repeatedly participates in the arbitration until the participation in the arbitration is successful (the arbitration passes).

When successful participation in the arbitration (the arbitration passes), the header output unit 13 transmits the retained header to the crossbar switch 30. The header output unit 13 makes the data output units 14 and 15 output each data (even and odd flits).

In this way, the header output unit 13 participates in arbitration with data of the data output units 14 and 15, namely, a set of data with the bandwidth of 16 [B/T]. The header output unit 13, however, generates a header based on header control as described hereinafter so that it can participate in arbitration with a set of data.

After all the data (flits) are transmitted, the header output unit 13 waits again until data (flits) are provided on the data output units 14 and 15. Then, when data (flits) are provided on the data output units 14 and 15, the header output unit 13 participates in arbitration again.

The header output unit 13 repeats the above-mentioned operations until the final data (flits) are transmitted. When the total number of data (flits) is odd, for the last arbitration, the header output unit 13 participates in the arbitration when the data is provided on the data output unit 14.

The header output unit 13 executes header control as described below. After participating in arbitration, the header output unit 13 changes as many addresses in the header as needed for participation in the next arbitration. In this case, the header output unit 13 increases the address in the header by two flits (16 bytes) because the header output unit 13 participates in the arbitration with data (flits) of the data output units 14 and 15.

The data output unit 14 retains (accumulates) data (flit) which is participated in arbitration. In this description, the data output unit 14 accumulates even-numbered data (flit). When the header output unit 13 successfully participates in the arbitration (the arbitration passes), the data output unit 14 transmits the retained data to the crossbar switch 30. The data transmission from the data output unit 14 is also data release, which means the data output unit 14 can receive the next data.

The data output unit 15 retains (accumulates) data (flit) which is participated in arbitration. In this description, the data output unit 15 accumulates odd-numbered data (flit). When the header output unit 13 successfully participates in the arbitration (the arbitration passes), the data output unit 15 transmits the retained data to the crossbar switch 30. The data transmission from the data output unit 15 is also data release, which means the data output unit 15 can receive the next data.

In the above description, the header output unit 13 executes control of participation in arbitration. However, for the input port control unit 10 of this exemplary embodiment, another configuration may control participation in arbitration. For example, the data output unit 15 may control participation in arbitration in the case of data reception. In this case, the header output unit 13 may execute header control.

A configuration of the input port control unit 20 will be described with reference to a drawing.

Figure 7:
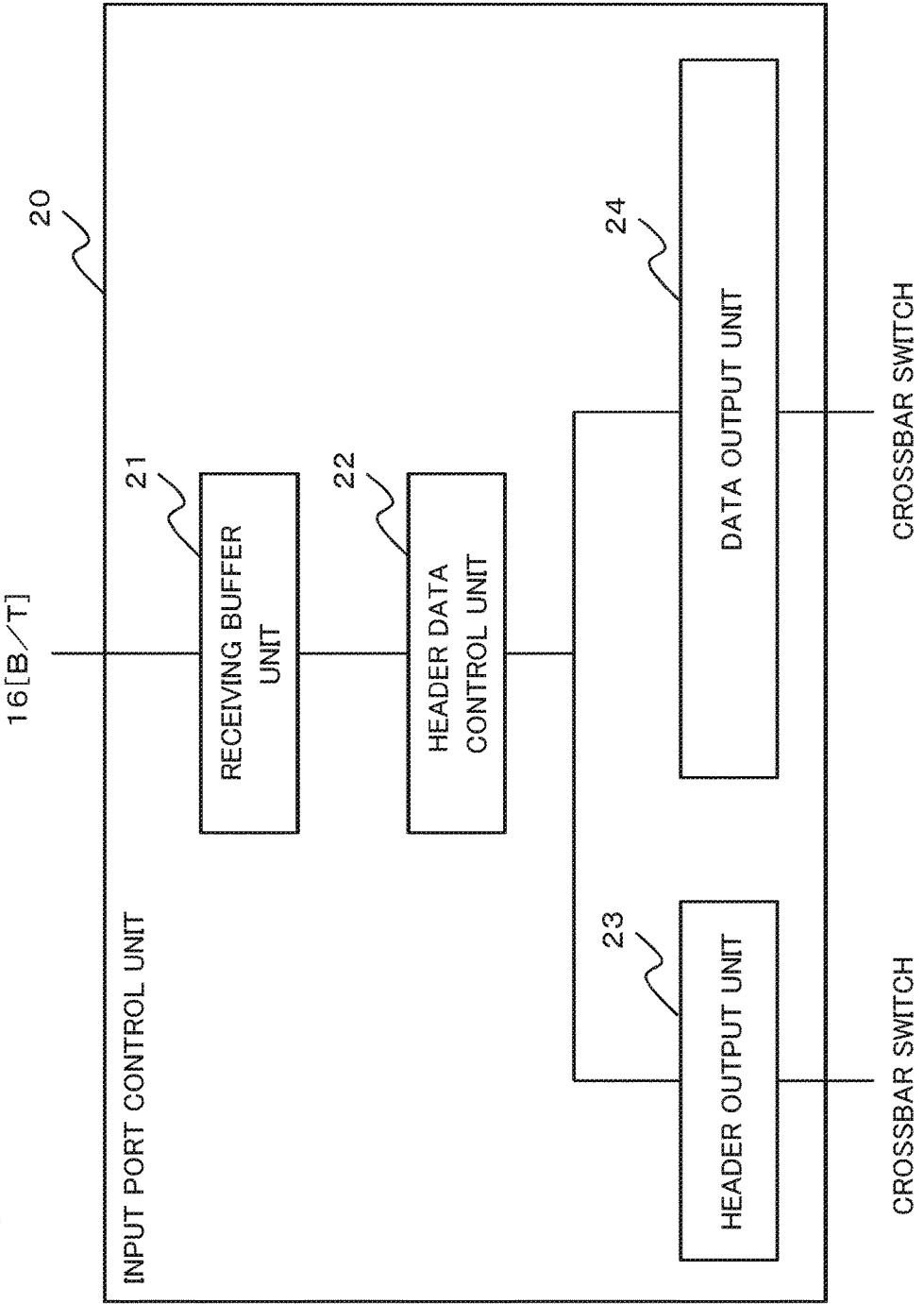
FIG. 7 is a block diagram showing an example of a configuration of a second input port control unit of the information processing device according to the first exemplary embodiment.

FIG. 7 is a block diagram showing an example of a configuration of the input port control unit 20 (a second input control unit). The input port control unit 20 includes a receiving buffer unit 21, a header data control unit 22, a header output unit 23, and a data output unit 24.

Similarly to the receiving buffer unit 11, the receiving buffer unit 21 transmits data (header and data) to the header data control unit 22 after receiving and temporarily retaining it. This means the receiving buffer unit 21 is the one that accumulates part of data similarly to the receiving buffer unit 11. This allows the input port control unit 20 to require reduced capacity (hardware amount) of a buffer.

The header data control unit 22 operates similarly to the header data control unit 12 except that the header data control unit 22 does not determine even or odd flit. This means, similarly to the header data control unit 12, the header data control unit 22 determines whether received information (flit) from the receiving buffer unit 21 is a header or data. When the flit is a header, the header data control unit 22 outputs the received flit (a header) to the header output unit 23. On the other hand, when the flit is data, the header data control unit 22 outputs the received flit (data) to the data output unit 24. Then, the header data control unit 22 transmits a data ready notification to the header output unit 23 when it outputs the data to the data output unit 24.

The header output unit 23, similarly to the header output unit 13, executes control of headers and participation in arbitration. The control of participation in arbitration on the header output unit 23 is similar to the one on the header output unit 13 except that it is executed at the timing when data is provided on the data output unit 24. Therefore, detailed descriptions of the header output unit 23 are omitted. The header control of the header output unit 23 is also similar to the one of the header output unit 13. For example, the header output unit 23 changes address in header after transmitting data in the case of successful participation in arbitration (the arbitration passes). Therefore, detailed descriptions of the header output unit 23 are omitted.

The data output unit 24, similarly to the data output units 14 and 15, outputs data to the crossbar switch 30 when participation in arbitration is successful (arbitration passes). In this way, the data output unit 24 is similar to the data output units 14 and 15 except that the data bandwidths they handle are different. Therefore, detailed descriptions of the data output unit 24 are omitted.

A configuration of the output port control unit 40 will be described with reference to a drawing.

Figure 8:
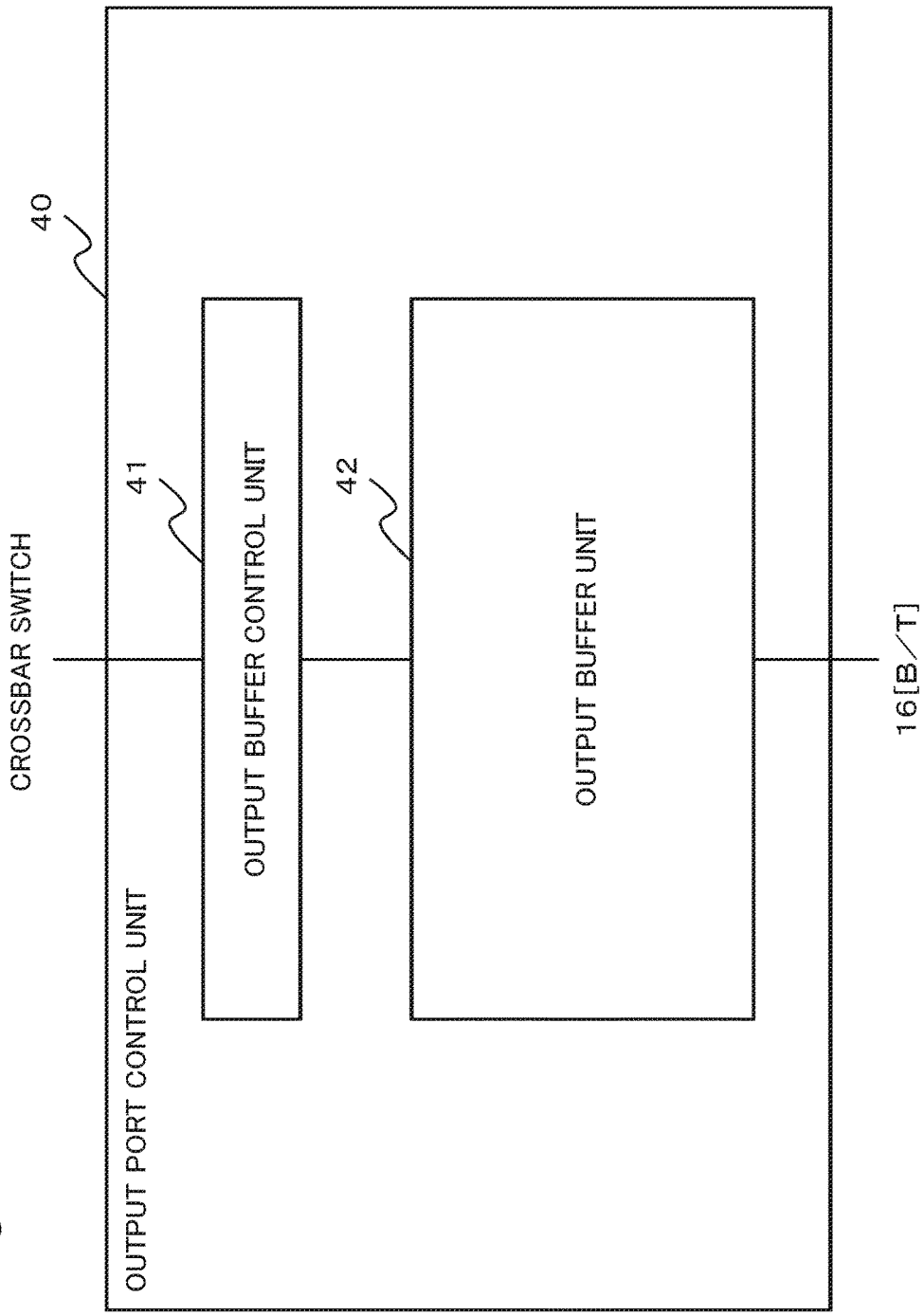
FIG. 8 is a block diagram showing an example of a configuration of an output port control unit of the information processing device according to the first exemplary embodiment.

FIG. 8 is a block diagram showing an example of a configuration of the output port control unit 40. The output port control unit 40 includes an output buffer control unit 41 and an output buffer unit 42.

The output buffer control unit 41 controls the operation for writing received data from the crossbar switch 30 into the output buffer unit 42.

For example, when the crossbar switch 30 executes division and arbitration, data for one header is divided and transmitted to the output port control unit 40. In this case, it is part of data that is transmitted with being attached to a header per transmission. This means there is a case in which the output port control unit 40 receives a block of data as a plurality of data whose addresses in the header are changed. Therefore, the output port control unit 40 executes data adjustment. The term "adjustment" means processing which writes proper addresses in the output buffer unit 42 into received data based on addresses in headers and brings the data together. In an adjustment, the output port control unit 40 executes address translation between addresses in a header and in the output buffer unit 42.

The output buffer unit 42 retains data. Then, the output buffer unit 42 is utilized for the aforementioned adjustment. The output buffer unit 42 also transmits the data, whose adjustment is completed, to an external device not shown. On this occasion, the output buffer unit 42 may execute timing adjustment with a device of an output destination. Because the output buffer unit 42 may be a commonly-used buffer as an output of the crossbar switch 30, detailed descriptions of the output buffer unit 42 are omitted. This means the output buffer unit 42 of the output port control unit 40 can be configured with the same level of hardware as a buffer for a common output port of the crossbar switch 30.

Description of Operation

Operations of the information processing device 50 according to this exemplary embodiment will be described with reference to drawings. The receiving buffer unit 11, the data output unit 14, and the data output unit 15 receive, retain, and transmit data. Because functions of them are similar one of common buffer, detailed descriptions of these functions are omitted. Likewise, detailed descriptions of the receiving buffer unit 21 and the data output unit 24 are omitted.

Figure 9:
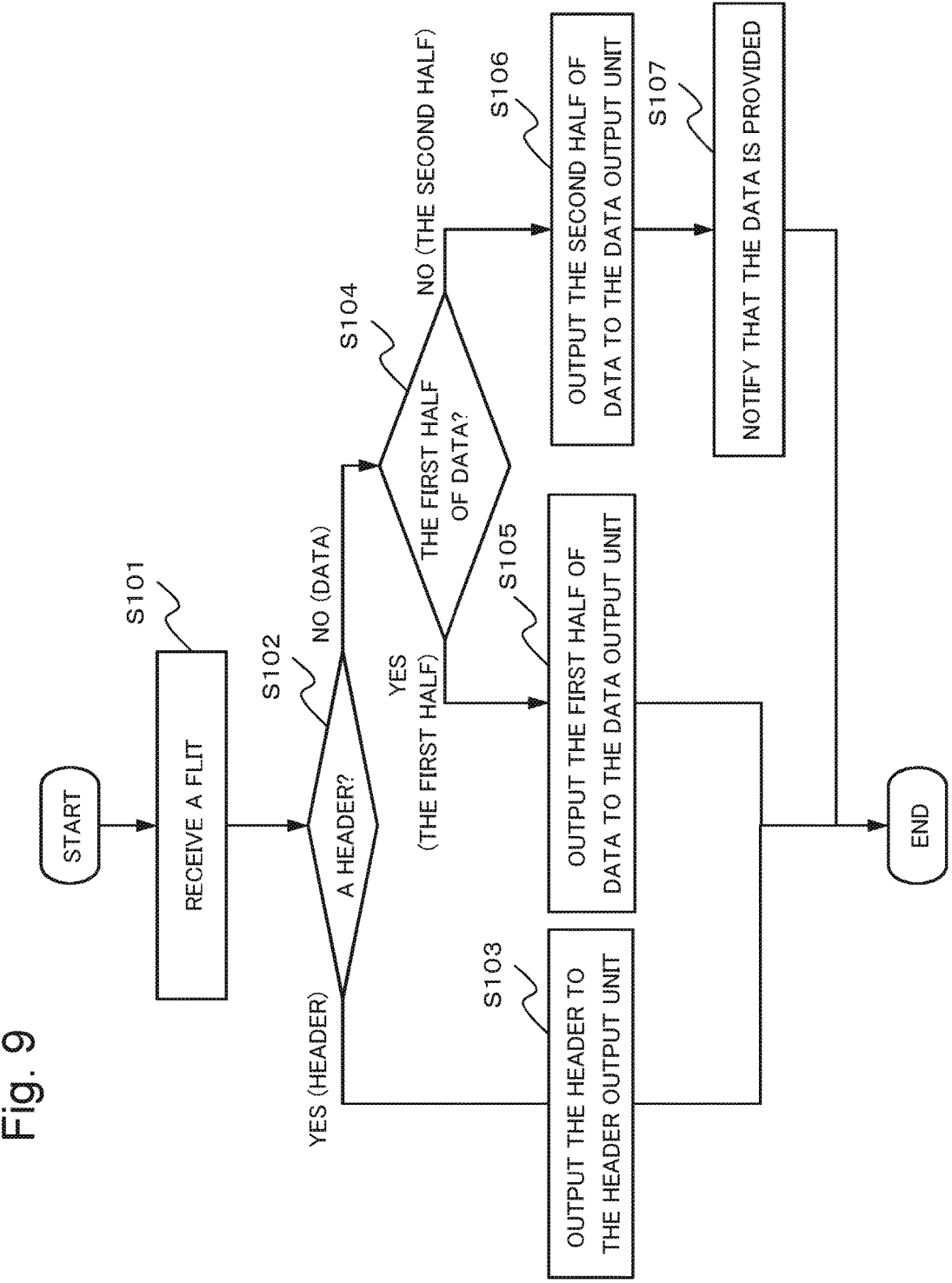
FIG. 9 is a flowchart showing an example of operation of a header data control unit according to the first exemplary embodiment.

FIG. 9 is a flowchart showing an example of operation of the header data control unit 12 in the input port control unit 10 included in the information processing device 50 according to this exemplary embodiment.

The header data control unit 12 starts processing when a flit (a header or data) is received from the receiving buffer unit 11 (step S101).

Next, the header data control unit 12 determines whether the received flit is a header or data (step S102).

When it is a header (Yes in step S102), the header data control unit 12 outputs the received flit (the header) to the header output unit 13 (step S103). Then, the header data control unit 12 ends the processing. This means the header data control unit 12 waits to receive the next flit.

When the flit is not a header, that is to say, it is data (No in step S102), the header data control unit 12 determines whether the flit is an even flit or an odd flit. The even flit is the first half of data. Alternatively, the odd flit is the second half of data. This means, in the processing of step S104, the header data control unit 12 determines whether the flit is the first half of data or not (step S104).

When it is the first half of data (Yes in step S104), the header data control unit 12 outputs the first half of data to the data output unit 14 (step S105). Then, the header data control unit 12 ends the processing. This means the header data control unit 12 waits to receive the next flit.

When it is not the first half of data, that is to say, it is the second half of data (No in step S104), the header data control unit 12 outputs the second half of data to the data output unit 15 (step S106).

The header data control unit 12 transmits a notification that the data for participation in arbitration is provided (a data ready notification) to the header output unit 13 (step S107). Then, the header data control unit 12 ends the processing. This means the header data control unit 12 waits to receive the next flit.

However, the transmission of the data ready notification to the header output unit 13 is not necessarily limited to the header data control unit 12. For example, the data output unit 15 may transmit a data ready notification.

The header data control unit 22 of the input port control unit 20 executes operations from which step S104 and S105 in FIG. 9 are omitted. This means, when a flit is data (No in step S102), the header data control unit 22 outputs the data to the data output unit 24 (corresponding to step S106). Then, the header data control unit 22 transmits a notification to the header output unit 23 (corresponding to step S107). The header data control unit 22 operates similarly to the header data control unit 12 for the other operations.

Figure 10:
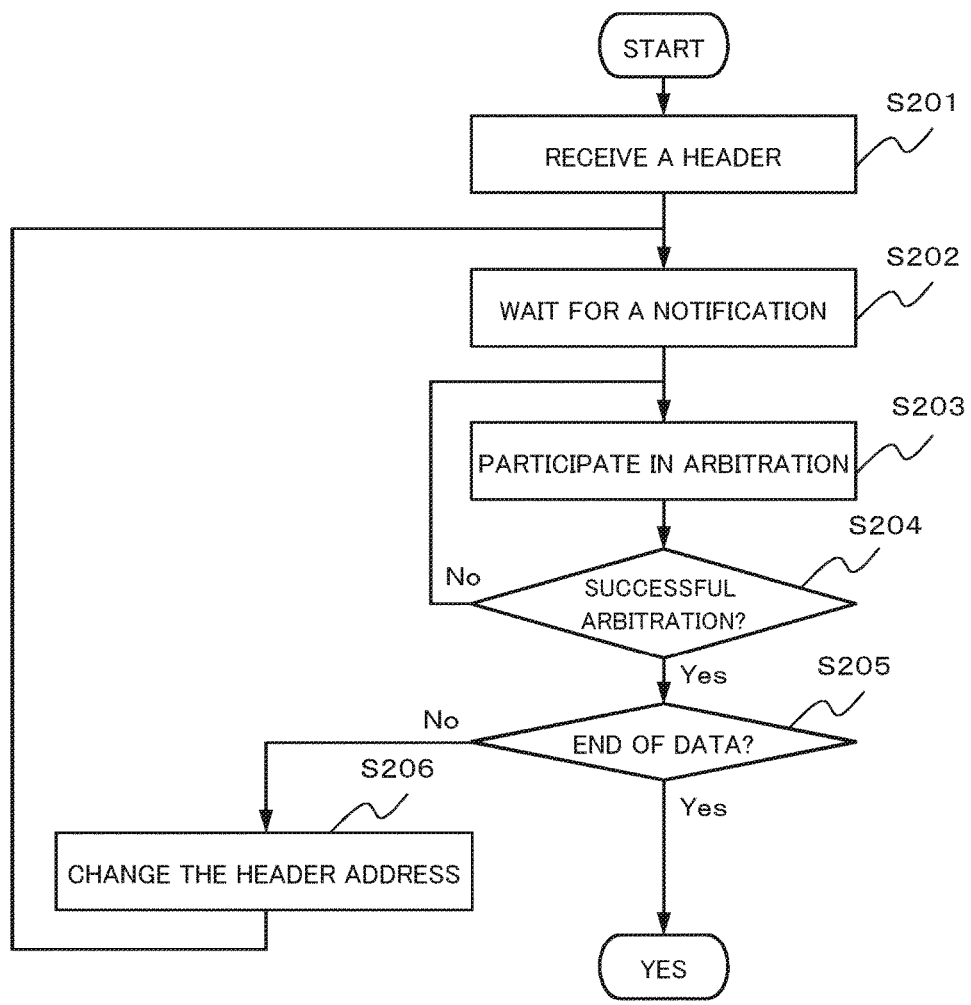
FIG. 10 is a flowchart showing an example of operation of a header output unit according to the first exemplary embodiment.

FIG. 10 is a flowchart showing an example of operation of the header output unit 13 in the input port control unit 10 included in the information processing device 50 according to this exemplary embodiment.

The header output unit 13 receives a header from the header data control unit 12 (step S201). It is preferable that the header data control unit 12 confirms the number of subsequent flits. The number is included in a header as payload.

Then, the header output unit 13 waits for a notification that the data is provided (a data ready notification) from the header data control unit 12 (step S202).

When the data ready notification is received, the header output unit 13 participates in arbitration of the crossbar switch 30 (step S203).

Then, the header output unit 13 determines whether the participation in the arbitration is successful or not (step S204).

When the arbitration is not successful (No in step S204), the header output unit 13 returns to step S203 and participates in arbitration again. The header output unit 13 repeats participation in arbitration until it is successful.

When the participation in the arbitration is successful (Yes in step S204), the header output unit 13 outputs the header to the crossbar switch 30. Furthermore, the header output unit 13 instructs the data output units 14 and 15 to output the first and second half of data to the crossbar switch 30.

After outputting the data, the header output unit 13 determines whether the data for participating in the arbitration ends or not (step S205). More specifically, the header output unit 13 determines whether the data ends or not based on the number of flits obtained from the above header and an address in the current header.

When it ends (Yes in step S205), the header output unit 13 ends the processing.

When it does not end (No in step S205), the header output unit 13 changes the address in the header (step S206). In this case, for example, the header output unit 13 increases an address by 16 bytes, as already described. Then, the header output unit 13 returns to step S202 and waits for a data ready notification.

The header output unit 23 in the input port control unit 20 may operate similarly to the header output unit 13 except to instruct the data output unit 24 on a request of an output to the crossbar switch 30.

Next, operations of the output port control unit 40 will be described with reference to drawings.

Figure 11:
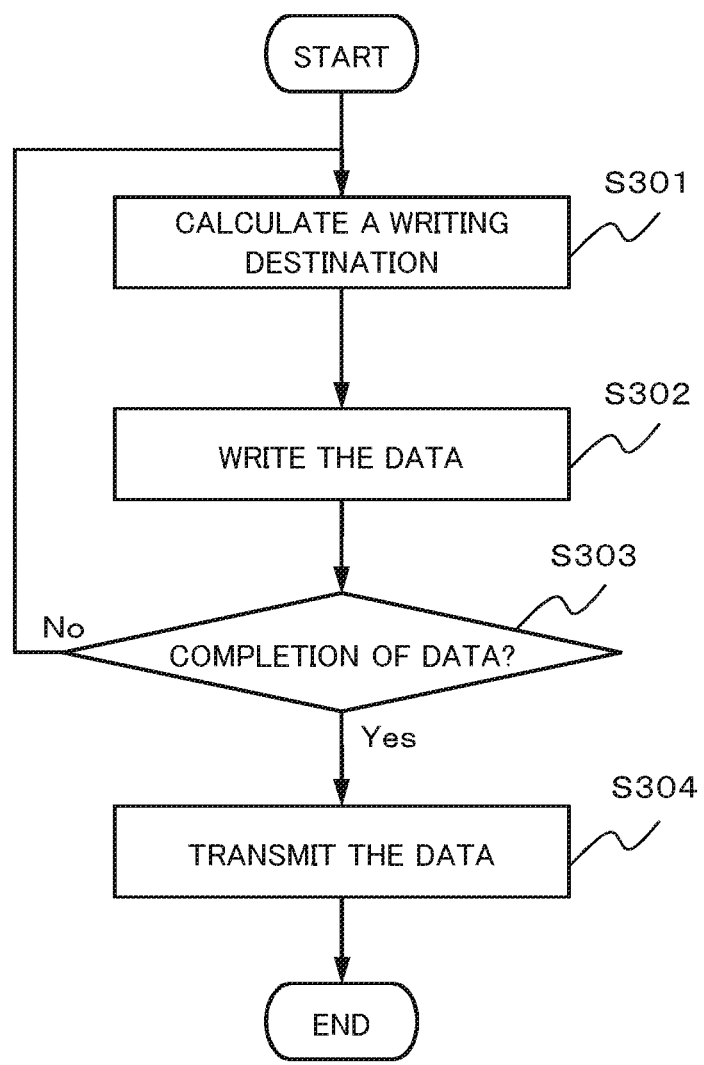
FIG. 11 is a flowchart showing an example of operation of an output port control unit of the information processing device according to the first exemplary embodiment.

FIG. 11 is a flowchart showing an example of operation of the output port control unit 40 of the information processing device 50 according to this exemplary embodiment.

The output buffer control unit 41 calculates an address for writing received data into the output buffer unit 42 (step S301).

Then, the output buffer control unit 41 writes the data on the calculated address in the output buffer unit 42 (step S302).

The output buffer control unit 41 determines whether the data is completed or not (step S303).

When the data is not completed (No in step S303), the output buffer control unit 41 returns to step S301 and waits for the next data.

When the data is completed (Yes in step S303), the output buffer control unit 41 instructs the output buffer unit 42 to transmit the data to a predetermined destination device. Based on the instruction, the output buffer unit 42 transmits the data (step S304).

Next, operations of the information processing device 50 will be described with a drawing with specific data.

Figure 4:
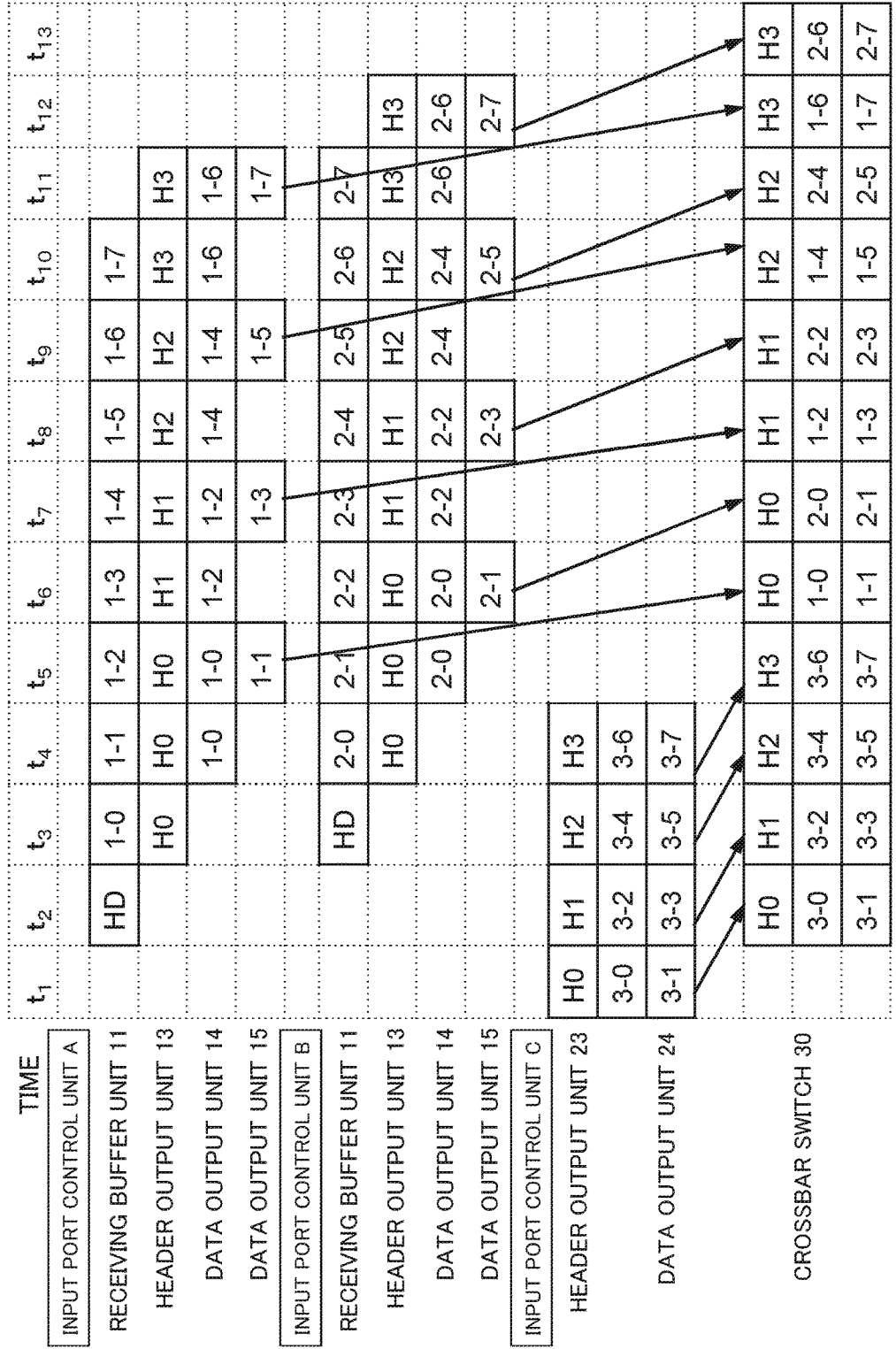
FIG. 4 is a diagram for describing operations of an information processing device according to a first exemplary embodiment.

FIG. 4 is a diagram for describing operations of the information processing device 50 according to this exemplary embodiment.

Firstly, the data of FIG. 4 will be described.

The top row of FIG. 4 indicates time. Specifically, FIG. 4 shows data between the time $t_1$ to $t_{13}$. The following four rows show data of the first input port control unit in the input port control unit 10 (hereinafter referred to as an input port control unit A). The next four rows show data of the second input port control unit in the input port control unit 10 (hereinafter referred to as an input port control unit B). The following three rows show data of the input port control unit 20 (hereinafter referred to as input port control unit C). The bottom three rows show output data from the crossbar switch 30.

The receiving buffer unit 11 of the input port control unit A receives data (flits) from the time $t_2$. The receiving buffer unit 11 of the input port control unit B receives data (flits) from the time $t_3$. The input port control unit C has received data (flits) from the time $t_0$ which is earlier than the time $t_1$ and not shown. In FIG. 4, however, a description of the receiving buffer unit 21 of the input port control unit C is omitted.

The input port control units A and B of this exemplary embodiment participate in arbitration when data is retained in the data output units 15. This means the input port control unit A participates in arbitration from the time $t_5$. The input port control unit B also participates in arbitration from the time $t_6$.

Therefore, the input port control unit C successfully participates in arbitration until the time $t_4$. This means, as shown in FIG. 4, the input port control unit C outputs received data with the bandwidth of 16 [T/B] to the crossbar switch 30.

The input port control unit A participates in the arbitration when data is retained in the data output unit 15, that is to say, from the time $t_5$. As shown in FIG. 4, the input port control unit C has completed the data output by the time $t_5$. This means the input port control unit C does not participate in the arbitration. Therefore, the input port control unit A successfully participates in the arbitration. The input port control unit A outputs a header and data of the data output units 14 and 15 (namely data with the bandwidth of 16 [B/T]) at the time $t_5$. After outputting the output, the data output units 14 and 15 of the input port control unit A release data. This means at the following time $t_6$, the input port control unit A has not been provided with data at the data output unit 15. Therefore, the input port control unit A does not participate in the arbitration at the time $t_6$.

On the other hand, at the time $t_6$, the input port control unit B participates in arbitration because data is provided at the data output unit 15. The input port control units A and C do not participate in the arbitration. Therefore, the input port control unit B successfully participates in the arbitration. Then, the input port control unit B outputs data with the bandwidth of 16 [B/T] at the time $t_7$.

In this way, the input port control units A and B can alternately output data with the bandwidth of 16 [B/T] as shown in FIG. 4.

As a result, the information processing device 50 can utilize all the bandwidths as shown in FIG. 4. This means the information processing device 50 can prevent a decline in performance. In the above description, the input port control units A and B have different timings of data, for clarity of description. However, the input port control units A and B may receive data at the same time. In this case, the input port control unit A or B which successfully participates in arbitration of the crossbar switch 30 can output data with the bandwidth of 16 [B/T].

The information processing device 50 may receive data with more than two types of bandwidths for inputs. In this case, the input port control unit 20 receives data with the highest bandwidth (the bandwidth of the input ports of the crossbar switch 30), and operates similarly to the above-mentioned description. On the other hand, the input port control unit 10 receives data with a plurality of low bandwidths. Then, the input port control unit 10 may participate in arbitration of the crossbar switch 30 after gathering the data so that the bandwidth of the data is adjusted to one of the input port of the crossbar switch 30 as described above. In this case, the input port control unit 10 should include the necessary number of data output units for processing in addition to the data output units 14 and 15.

For example, a case where the information processing device 50 receives data with bandwidths of 4 [B/T], 8 [B/T], and 16 [B/T] will be described.

In this case, the input port control unit 20 receives data with the bandwidth of 16 [B/T]. Alternatively, the input port control units 10 receive data with the bandwidths of 4 [B/T] and 8 [B/T]. The input port control unit 10 for receiving the data with the bandwidth of 8 [B/T] and the input control unit 20 operate similarly to the above-mentioned description.

On the other hand, the input port control unit 10 which receives data with the bandwidth of 4 [B/T] includes two data output units in addition to the data output units 14 and 15. The input port control unit 10 classifies data flits into four types. For example, the input port control unit 10 classifies the data flits into four types based on a remainder when the number of the data flits is divided by four. Then, the input port control unit 10 retains four types of data flits on the data output units 14 and 15 and the additional two data output units. The input port control unit 10 may participate in arbitration when four types of the data flits are provided.

Also, the information processing device 50 may include the output port control units 40 with different bandwidths. In this case, the information processing device 50 may exchange operations of the input port control units 10 and 20 according to a bandwidth of the output port control unit 40.

For example, when outputting data to the output port control unit 40 with a bandwidth of 8 [B/T], the input port control unit 10 may process data with a bandwidth of 4 [B/T] and the input port control unit 20 may process data with a bandwidth of 8 [B/T].

Description of Effect

Effects of this exemplary embodiment will be described.

As described above, the information processing device 50 according to this exemplary embodiment can achieve an effect of reducing increases in buffers (hardware) required for input ports.

The reasons are as described below.

In the input port control unit 10 according to this exemplary embodiment, the receiving buffer unit 11 receives data (headers or data) which is divided into flits and transmitted. Then, the header data control unit 12 distributes a header and the first and second half of data to the header output unit 13, the data output unit 14, and the data output unit 15, and makes them retain the header and the first and second half of data. When the data is provided, the header output unit 13 participates in arbitration of the crossbar switch 30. In this way, the input port control unit 10 for receiving data with a low bandwidth retains the data with a low bandwidth, and outputs the data with the same bandwidth as the data with a high bandwidth. This means the input port control unit 10 participates in arbitration of the crossbar switch 30 to avoid generating wasted bandwidths. Therefore, the information processing device 50 can prevent a decline in performance.

Furthermore, capacity of the data output units 14 and 15 is for retaining one flit. Capacity of the receiving buffer unit 11 is also for retaining one flit. These mean capacity required for the input port control unit 10 is for a few of flits.

As described above, the information processing device 50 can achieve an effect of preventing a decline in its performance while cutting capacity required for buffers.

Modification

The information processing device 50 described above is configured as follows.

For example, each configuration unit of the information processing device 50 is configured with hardware circuits.

Alternatively, configuration units of the information processing device 50 may be configured with a plurality of devices which are connected through networks mutually.

A plurality of configuration units of the information processing device 50 may be configured with one piece of hardware. For example, the data output units 14 and 15 may be configured with one storage unit.

Alternatively, the information processing device 50 may be realized as a computer device which includes a CPU (Central Processing Unit), a ROM (Read Only Memory), and a RAM (Random Access Memory). The information processing device 50 may be further realized as a computer device which includes an IOC (Input/Output Circuit) and an NIC (Network Interface Circuit) in addition to the above configuration.

Figure 12:
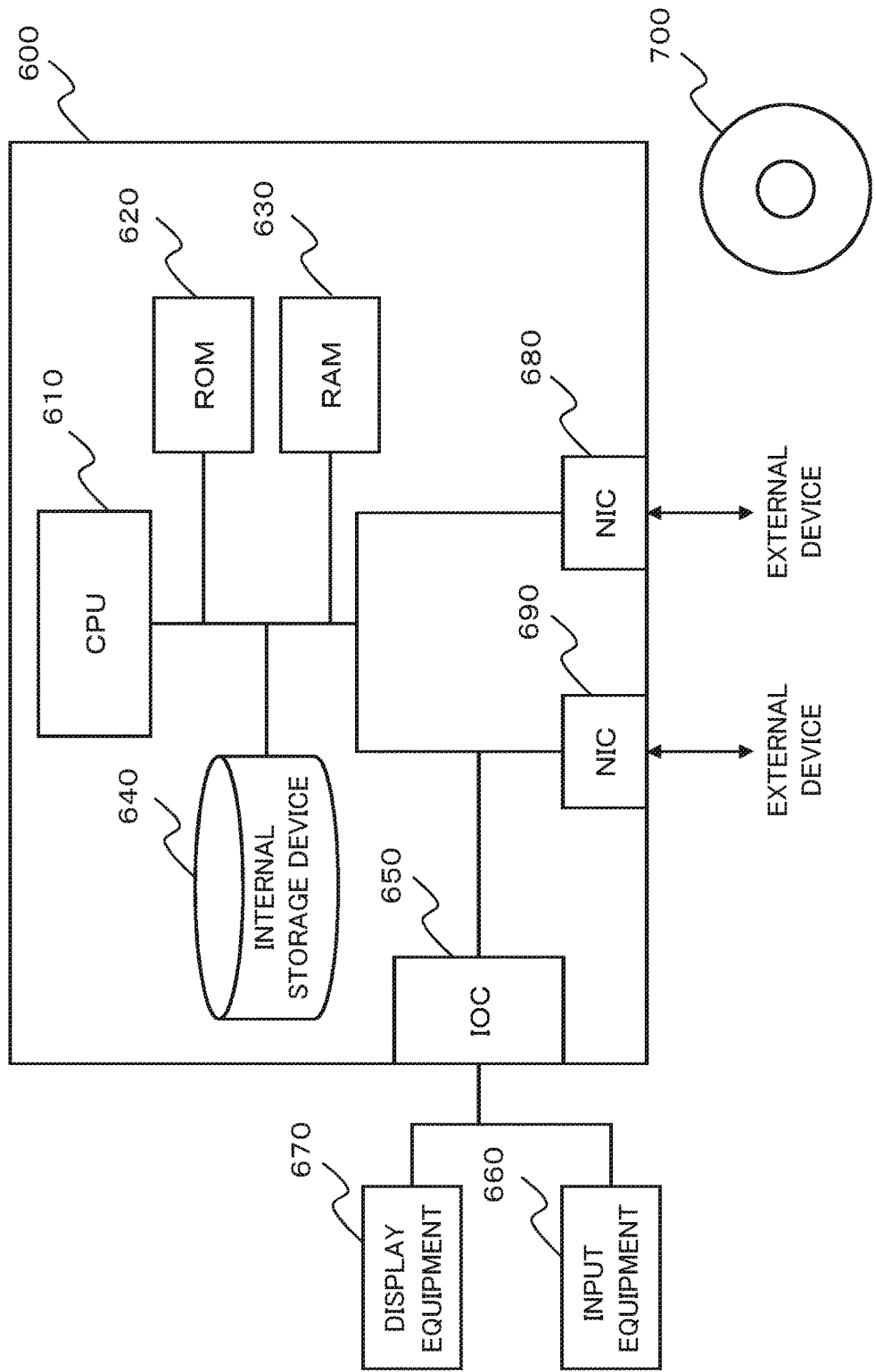
FIG. 12 is a block diagram showing an example of another configuration of the information processing device according to the first exemplary embodiment.

FIG. 12 is a block diagram showing an example of a configuration of an information processing device 600 according to this modification.

The information processing device 600 includes a CPU 610, a ROM 620, a RAM 630, an internal storage device 640, an IOC 650, an NIC 680, and an NIC 690, and is configured as a computer device.

The CPU 610 reads a program from the ROM 620. Then, the CPU 610 controls the RAM 630, the internal storage device 640, the IOC 650, the NIC 680, and NIC 690 based on the read program. A computer including the CPU 610 controls these configurations, and realizes each function as the input port control units 10, the input port control units 20, the crossbar switch 30, and the output port control units 40 shown in FIG. 5. The information processing device 600 may include a circuit, an electrical element, or a device (hardware) to realize the crossbar switch 30 not shown for speeding up processing.

When the CPU 610 realizes each function, the CPU 610 may use the RAM 630 or the internal storage device 640 as a temporary storage for the program.

The CPU 610 may also read, by using a recording medium reader not shown, a program which a recording media 700 includes and stores in a computer-readable format. Alternatively, the CPU 610 may accept the program from an external device not shown through the NIC 680 or 690, save the program on the RAM 630, and operate based on the saved program.

The ROM 620 stores the program executed by the CPU 610 and fixed data. The ROM 620 is, for example, a P-ROM (Programmable-ROM) or a flash ROM.

The RAM 630 temporarily stores the program executed by the CPU 610 and data. The RAM 630 is, for example, a D-RAM (Dynamic-RAM).

The internal storage device 640 stores data and a program which the information processing device 600 saves on a long-term basis. The internal storage device 640 may also operate as a temporary storage device for the CPU 610. The internal storage device 640 is, for example, a hard disk device, a magnetic optical disk device, an SSD (Solid State Drive), or a disk array device.

These ROM 620 and internal storage device 640 are non-transitory storage medium. On the other hand, the RAM 630 is a transitory storage media. The CPU 610 can operate based on a program stored on the ROM 620, the internal storage device 640, or the RAM 630. This means the CPU 610 can operate with a non-transitory or transitory storage media.

The IOC 650 mediates data between the CPU 610, and input equipment 660 and display equipment 670. The IOC 650 is, for example, an I/O interface card or a USB (Universal Serial Bus) card.

The input equipment 660 is the one that accepts an input instruction from an operator of the information processing device 600. The input equipment 660 is, for example, a keyboard, a mouse, or a touch screen.

The display equipment 670 is the one that displays information to the operator of the information processing device 600. The display equipment 670 is, for example, a liquid crystal display.

The NICs 680 and 690 relay data for exchange with an external device not shown through a network. The NICs 680 and 690 are, for example, LAN (Local Area Network) cards. For example, the NIC 680 receives data and the NIC 690 outputs data. The information processing device 600 may realize data reception and transmission with one of either the NIC 680 or 690. In this case, the information processing device 600 may not include the NIC 680 or 690 that is not used for reception or transmission.

The information processing device 600 configured in this manner can achieve the same effects as the information processing device 50.

That is because the CPU 610 of the information processing device 600 can realize the same functions as the information processing device 50 based on a program.

The present invention can be utilized for an information processing device, an information processing system, or a network switch that includes a communication network with a plurality of input ports and output ports, such as a crossbar switch, and has at least part of input ports with different bandwidths.

It is necessary that a scheme of using a buffer described in PTL 2 is equipped with buffers (hardware) on input ports to save all the flits (data) required for arbitration. This is because the input ports have to transmit all the flits when the participation in the arbitration is successful. Therefore, there is a problem that the buffers (hardware) on the input ports get bigger and bigger as the number of the flits increases.

The technology described in PTL 2 has a problem that buffers on input port get big, as described above.

Based on the present invention, an effect of reducing buffers (hardware) required for input ports can be achieved.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

The invention claimed is:

1. An information processing device, comprising:
a crossbar switch which arbitrates a plurality of input data, and outputs the arbitrated input data to either one of a plurality of output destinations;
an output port control unit which receives output data from the crossbar switch as the output destination of the crossbar switch, and transmits the received output data to an external device;
a first input port control unit which receives first data that is received with a lower bandwidth than a bandwidth of the crossbar switch and includes first half of main body of data, second half of main body of data, and a header, and outputs the first data by changing the bandwidth of the second data to the same bandwidth as the bandwidth of the crossbar switch to the crossbar switch; and
a second input port control unit which receives second data that is received with the same bandwidth as the bandwidth of the crossbar switch, and outputs the second data to the crossbar switch without changing the bandwidth of the second data wherein
the first input port control unit comprises:
a first receiving buffer unit which receives and temporarily retains the first data with the lower bandwidth;
a first data output unit which receives and retains first half data which is a first half of the main body of data included in the first data, and outputs the first half data;

a second data output unit which receives and retains second half data which is a second half of a main body of data included in the first data;

a first header output unit which receives and retains a header which is included in the first data; and a first header data control unit which receives the first data from the first receiving buffer, determines whether the data received from the first receiving buffer unit is the header, the first half of main body of data, or the second half of main body of data, outputs the received first data to the first header output unit when the received first data is the header, outputs the received first data to the first data output unit when the received first data is the first half of main body of data, outputs the received first data to the second data output unit when the received first data is the second half of main body of data, wherein the first header data control unit notifies the first header output unit of a predetermined notification when outputting data to both the first data output unit and the second output unit, and the first header output unit participates in the arbitration of the crossbar switch based on the predetermined notification, and transmits the header retained and makes the first data output unit and the second data output unit output data retained respectively when the arbitration participation is successful.

2. The information processing device according to claim 1, wherein the first header output unit transmits a retained header to the crossbar switch and instructs the first data output unit and the second data output unit to output retained data to the crossbar switch when the participation in the arbitration of the crossbar switch is successful, and the first data output unit and the second data output unit output retained data to the crossbar switch based on the instruction.

3. The information processing device according to claim 1, wherein the first header transmitting unit changes an address of a retained header to be able to participate in next arbitration after participating in the arbitration.

4. The information processing device according to claim 1, wherein the second input port control unit comprises:

a second receiving buffer unit which receives and temporarily retains data;

a third data output unit which receives and retains a main body of data included in data;

a second header output unit which receives and retains a header included in data, and participates in the arbitration of the crossbar switch based on a predetermined notification; and a second header data control unit which determines whether or not the data received by the second receiving buffer unit is a header, outputs the header to the second header output unit when the data is the header and the data to the third data output unit when the data is a main body of data, and notifies the second header output unit that the data has been output to the third data output unit as a predetermined notification to the second header output unit.

5. The information processing device according to claim 1, wherein the output port control unit comprises:

an output buffer unit which retains received data from the crossbar switch; and an output buffer control unit which calculates an address to retain the received data from the crossbar switch on the output buffer unit, and retains the received data at the address in the output buffer unit.

6. An information processing method, in an information processing device, the information processing device comprising:

a crossbar switch which arbitrates a plurality of input data, and outputs the arbitrated input data to either one of a plurality of output destinations, the method comprising:

transmitting output data from the crossbar switch to an external device;

receiving first data with a lower bandwidth than a bandwidth of the crossbar switch, the first data including first half of main body of data, second half of main body of data, and a header, and outputting the first data by changing the bandwidth of the second data to the same bandwidth as the bandwidth of the crossbar switch to the crossbar switch;

receiving second data that is received with the same bandwidth as the bandwidth of the crossbar switch, and outputting the second data to the crossbar switch without changing the bandwidth of the second data;

receiving and temporarily retaining, by a first receiving buffer unit of the information processing device, the first data with the lower bandwidth;

receiving and retaining, by a first data output unit of the information processing device, first half data which is a first half of the main body of data included in the first data, and outputting the first half data;

receiving and retaining, by a second data output unit of the information processing device, second half data which is a second half of a main body of data included in the first data;

receiving and retaining, by a first header output unit of the information processing device, a header which is included in the first data;

receiving the first data from the first receiving buffer, by a first header data control unit of the information processing device, and determining, by the first header data control unit, whether the data received from the first receiving buffer unit is the header, the first half of main body data, or the second half of main body data, outputting the received first data to the first header output unit when the received first data is the header, and outputting the received first data to the first data output unit when the received first data is the first half of main body of data, and outputting the received first data to the second data output unit when the received first data is the second half of main body of data, and notifying the first header output unit of a predetermined notification when outputting data to both the first data output unit and the second data output unit; and participating, by the first header output unit, in the arbitration of the crossbar switch based on the predetermined notification, and transmitting, by the first header output unit, the header retained and making the first data output unit and the second data output unit output data retained respectively when the arbitration participation is successful.

7. A computer readable non-transitory recording medium embodying a program, the program causing a computer to perform a method, the computer comprising:

a crossbar switch which arbitrates a plurality of input data, and outputs the arbitrated input data to either one of a plurality of output destinations, the method comprising:

transmitting output data from the crossbar switch to an external device;

receiving first data with a lower bandwidth than a bandwidth of the crossbar switch, the first data including first half of main body of data, second half of main body of data, and a header, and outputting the first data by changing the bandwidth of the second data to the same bandwidth as the bandwidth of the crossbar switch to the crossbar switch;

receiving second data that is received with the same bandwidth as the bandwidth of the crossbar switch, and outputting the second data to the crossbar switch without changing the bandwidth of the second data;

receiving and temporarily retaining, by a first receiving buffer unit of the information processing device, the first data with the lower bandwidth;

receiving and retaining, by a first data output unit of the information processing device, first half data which is a first half of the main body of data included in the first data, and outputting the first half data;

receiving and retaining, by a second data output unit of the information processing device, second half data which is a second half of a main body of data included in the first data;

receiving and retaining, by a first header output unit of the information processing device, a header which is included in the first data;

receiving the first data from the first receiving buffer, by a first header data control unit of the information processing device, and determining, by the first header data control unit, whether the data received from the first receiving buffer unit is the header, the first half of main body data, or the second half of main body data, outputting the received first data to the first header output unit when the received first data is the header, and outputting the received first data to the first data output unit when the received first data is the first half of main body of data, and outputting the received first data to the second data output unit when the received first data is the second half of main body of data, and notifying the first header output unit of a predetermined notification when outputting data to both the first data output unit and the second data output unit; and participating, by the first header output unit, in the arbitration of the crossbar switch based on the predetermined notification, and transmitting, by the first header output unit, the header retained and making the first data output unit and the second data output unit output data retained respectively when the arbitration participation is successful.

* * * * *